United States Patent
Pan et al.

(10) Patent No.: US 8,501,368 B2
(45) Date of Patent: Aug. 6, 2013

(54) INTER-PENETRATED PROTON EXCHANGE MEMBRANE, METHOD FOR MANUFACTURING THE SAME, AND PROTON EXCHANGE MEMBRANE FUEL CELL UTILIZING THE SAME

(75) Inventors: Jing-Pin Pan, Hsinchu Hsien (TW); Yueh-Wei Lin, Hsinchi (TW); Chung-Liang Chang, Hsinchu (TW); Li-Duan Tsai, Hsinchu (TW); Ya-Tin Hsu, Taipei (TW)

(73) Assignee: Industrial Technology Research Institute (TW)

( * ) Notice: Subject to any disclaimer, the term of this patent is extended or adjusted under 35 U.S.C. 154(b) by 717 days.

(21) Appl. No.: 12/567,048

(22) Filed: Sep. 25, 2009

(65) Prior Publication Data

US 2010/0167102 A1 Jul. 1, 2010

(30) Foreign Application Priority Data

Dec. 30, 2008 (TW) .............................. 97151397 A
Sep. 8, 2009 (TW) .............................. 98130178 A

(51) Int. Cl.
*H01M 8/10* (2006.01)
(52) U.S. Cl.
USPC ...................................................... 429/493
(58) Field of Classification Search
USPC ........................................................ 429/494
See application file for complete search history.

(56) References Cited

U.S. PATENT DOCUMENTS

| | | | |
|---|---|---|---|
| 4,983,690 A | 1/1991 | Cameron et al. | |
| 8,008,360 B2 * | 8/2011 | Chang et al. | 521/27 |
| 2008/0075999 A1 * | 3/2008 | Izuhara et al. | 429/33 |
| 2008/0160418 A1 * | 7/2008 | Pan et al. | 429/328 |
| 2008/0176141 A1 * | 7/2008 | Pan et al. | 429/325 |
| 2010/0167101 A1 * | 7/2010 | Wang et al. | 429/33 |
| 2011/0033773 A1 * | 2/2011 | Chang et al. | 429/483 |

FOREIGN PATENT DOCUMENTS

| | | |
|---|---|---|
| CN | 101210073 | 7/2008 |
| JP | 2010126723 | 6/2010 |
| TW | 200827026 | 7/2008 |
| TW | 200832781 | 8/2008 |

OTHER PUBLICATIONS

English Translation of Office Action dated Feb. 7, 2012 from corresponding application No. JP 2009-293026.
Office Action dated Oct. 22, 2013 from corresponding application No. TW 98130178.

* cited by examiner

*Primary Examiner* — Patrick Ryan
*Assistant Examiner* — Lucas J O Donnell
(74) *Attorney, Agent, or Firm* — Lowe Hauptman Ham & Berner, LLP

(57) ABSTRACT

The disclosed forms a proton exchange membrane. First, multi-maleimide and barbituric acid are copolymerized to form a hyper-branched polymer. Next, the solvent of the sulfonated tetrafluoroethylene copolymer (Nafion) aqueous solution is replaced from water with dimethyl acetamide (DMAc). 10 to 20 parts by weight of the hyper-branched polymer is added to the 90 to 80 parts by weight of the Nafion in a DMAc solution, stood and heated to 50° C. to inter-penetrate the hyper-branched polymer and the Nafion. The heated solution is coated on a substrate, baked, and pre-treated to remove residue solvent for completing an inter-penetrated proton exchange membrane.

17 Claims, 3 Drawing Sheets

INTER-PENETRATED PROTON EXCHANGE MEMBRANE, METHOD FOR MANUFACTURING THE SAME, AND PROTON EXCHANGE MEMBRANE FUEL CELL UTILIZING THE SAME

CROSS REFERENCE TO RELATED APPLICATIONS

This Application claims priorities of Taiwan Patent Application No. 097151397, filed on Dec. 30, 2008, and Taiwan Patent Application No. 098130178, filed on Sep. 8, 2009, the entireties of which are incorporated by reference herein.

BACKGROUND OF THE INVENTION

1. Field of the Invention

The present invention relates to proton exchange membrane, and in particular relates to a method and composition to improve size stability of the membrane.

2. Description of the Related Art

Nafion® (sulfonated tetrafluoroethylene copolymer) is a conductive polymer developed by Dupont in 1960's. This compound is also called ionomer due to its ionic property that comes from the sulfonatic acid grafted on terminal of the polytetrafluoroethylene bone chain. Nafion has excellent thermal stability and mechanical property, thereby being important in the proton exchange membrane fuel cell (PEMFC) field.

The proton of the sulfonatic acid in the Nafion can transfer from one solfonic acid to another to complete proton exchange. On the contrary, the electron and cation cannot process above transfer.

Although Nafion has many advantages, its size enormously changes after being heated. U.S. Pat. No. 4,983,690 discloses a blend of Nafion and bismaleimide to improve physical properties of Nafion film, however, it still fails to solve the enormous size changes after being heated.

Accordingly, a novel method for improving physical properties of Nafion film is called for.

BRIEF SUMMARY OF THE INVENTION

The invention provides an inter-penetrated proton exchange membrane, comprising: 80 to 90 parts by weight of the sulfonated tetrafluoroethylene copolymer; and 20 to 10 parts by weight of hyper-branched polymer polymerized by multi-maleimide and barbituric acid, wherein the sulfonated tetrafluoroethylene copolymer and the hyper-branched polymer inter-penetrate each other. The multi-maleimide is represented by formula as below:

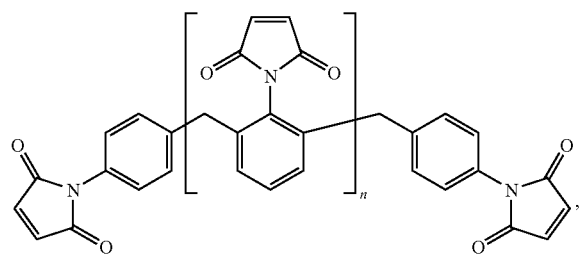

wherein n is an integral of 0 to 4.

The invention also provides a method for forming an inter-penetrated proton exchange membrane, comprising: copolymerizing multi-maleimide and barbituric acid to form a hyper-branched polymer; replacing water of the sulfonated tetrafluoroethylene copolymer aqueous solution with dimethyl acetamide (DMAc); adding 10 to 20 parts by weight of the hyper-branched polymer to 90 to 80 parts by weight of the sulfonated tetrafluoroethylene copolymer in a DMAc solution to form a mixture; standing and heating the mixture to 50° C. to inter-penetrate the hyper-branched polymer and the sulfonated tetrafluoroethylene copolymer, thereby forming an inter-penetrated polymer solution; coating the inter-penetrated polymer solution on a substrate; and baking and pre-treating the coating to remove residue DMAc for completing an inter-penetrated proton exchange membrane. The multi-maleimide is represented by formula as below:

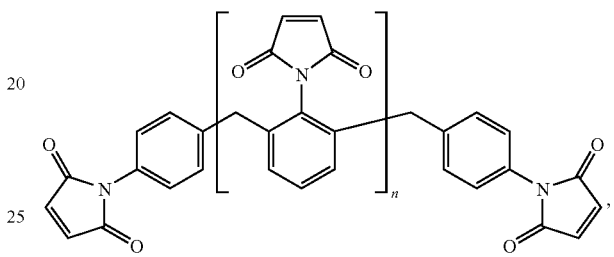

wherein n is an integral of 0 to 4.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
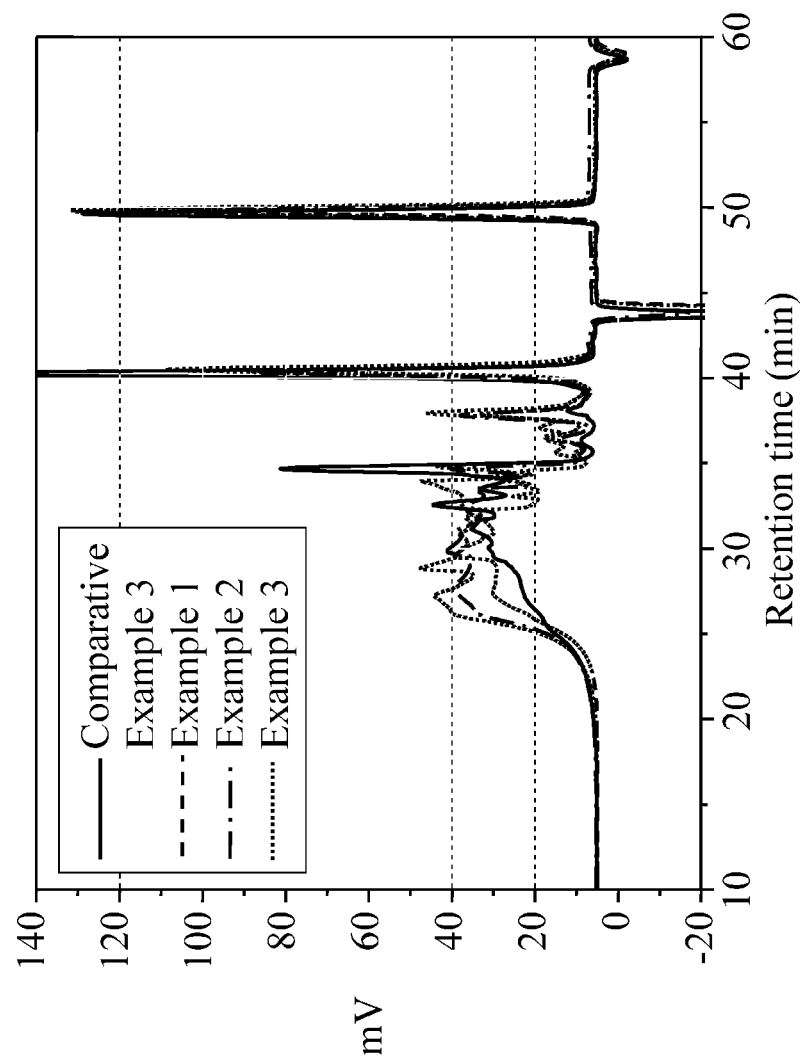
FIG. 1 is a diagram showing GPC curves of several hyper-branched polymers in Examples and Comparative Examples of the invention.

The following description is of the best-contemplated mode of carrying out the invention. This description is made for the purpose of illustrating the general principles of the invention and should not be taken in a limiting sense. The scope of the invention is best determined by reference to the appended claims.

The invention provides a method for forming an inter-penetrated proton exchange membrane. Firstly, multi-maleimide and barbituric acid are polymerized to form a hyper-branched polymer. The multi-maleimide is represented by Formula 1, wherein n is an integral of 0 to 4.

(Formula 1)

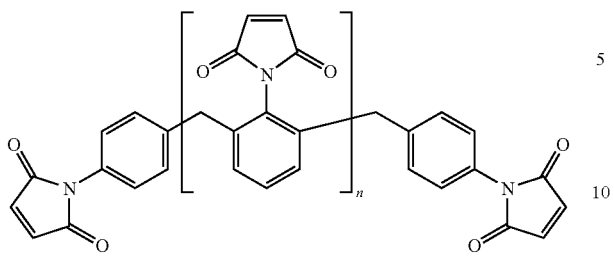

The barbituric acid is represented by Formula 2, wherein each of $R_2$ and $R_3$ is independently selected from hydrogen, methyl, phenyl, isopropyl, isobutyl, or isopentyl.

(Formula 2)

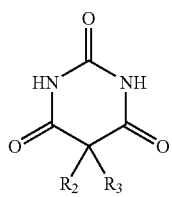

In one embodiment, the multi-maleimide and the barbituric acid have a molar ratio of 10:1 to 1:1. Appropriate ratio of multi-maleimide and barbituric acid are added to γ-butyrolactone (GBL), heated to 130° C., and left to react at 130° C. for 4 hours to obtain a hyper-branched polymer. In one embodiment, the hyper-branched polymer has an average molecular weight (Mn) of 10,000 to 17,000.

Subsequently, the solvent of the sulfonated tetrafluoroethylene copolymer (Nafion) aqueous solution is replaced from water with high boiling point solvent such as dimethyl acetamide (DMAc). The replacement is processed by adding high boiling point solvent such as DMAc to the Nafion aqueous solution and then heating the mixture to vaporize water thereof. In one embodiment, the Nafion is NAF DE2020CS commercially available from Dupont.

The hyper-branched polymer is added to the Nafion DMAc solution, stood and heated to 50° C., such that the hyper-branched polymer and the Nafion are inter-penetrated with each other to form a so-called inter-penetrated polymer. The hyper-branched polymer and the Nafion had a weight ratio of 10:90 to 20:80. The inter-penetrating degree of the hyper-branched polymer and the Nafion is determined by the transparency, wherein higher transparency means higher inter-penetrating degree and lower transparency means lower inter-penetrating degree. Note that the step of heating and standing the mixture is completely standing, and the general mixing methods such as stirring or supersonic vibration are unfavorable for forming the inter-penetrated polymer. If the inter-penetrating degree is too low, the proton exchange membrane will have poor dimensional stability.

Finally, the inter-penetrated polymer solution is coated on a substrate, baked to 130° C., and pre-treated. The pre-treatment is dipped in $H_2O$, 3% $H_2O_2$, $H_2O$, 0.5M $H_2SO_4$, and $H_2O$, respectively, wherein each treatment step is processed at 80° C. for 1 hour. The residue DMAc was removed by the described pre-treatment process to form a proton exchange membrane. The proton exchange membrane after pre-treatment had lower stability than the proton exchange membrane without pre-treatment, however, the proton exchange membrane after pre-treatment has higher conductivity. It is understood that the described proton exchange membrane can be applied to proton exchange membrane fuel cells due to its excellent properties such as ionic conductivity of $6.5*10^{-2}$ to $6.5*10^{-1}$ S/cm, Tg of 110 to 180, and water uptake ratio of 26% to 30%.

EXAMPLES

Comparative Example 1

30 g of Nafion aqueous solution (DE2020CS, commercially available from Dupont) was added 18 g DMAc, and then heated to 60° C. by a water bath to replace water and alcohol of the solvent in the Nafion solution with DMAc.

Figure 2:
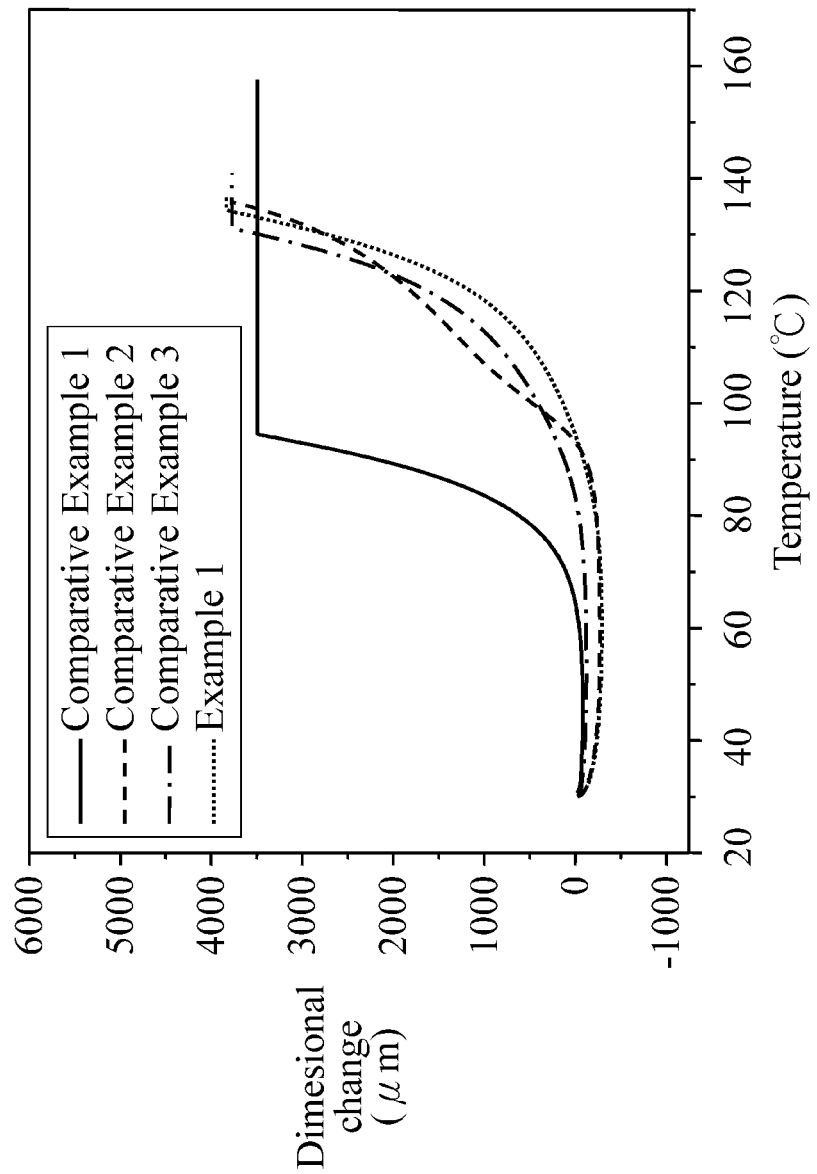
FIG. 2 is a diagram showing the size stability versus temperature curves of the proton exchange membranes in Examples and Comparative Examples of the invention.

The described Nafion DMAc solution was directly coated on a substrate, baked to 130° C. to remove most of the solvent. The dried film was sequentially pre-treated by $H_2O$, 3% $H_2O_2$, $H_2O$, 0.5M $H_2SO_4$, and $H_2O$, respectively, wherein each treatment step was processed at 80° C. for 1 hour. The residue solvent was removed by the described pre-treatment process to form a 10 cm*10 cm*0.003 cm proton exchange membrane. The described proton exchange membrane had ionic conductivity of about $6.55*10^{-2}$ S/cm, Tg of 85° C., and water uptake (WU) of 20.1%. The curve of membrane size change versus temperature is shown in FIG. 2.

Comparative Example 2

30 g of Nafion aqueous solution (DE212CS, commercially available from Dupont) was added 18 g DMAc, and then heated to 60° C. by a water bath to replace water and alcohol of the solvent in the Nafion solution with DMAc.

The described Nafion DMAc solution was directly coated on a substrate, baked to 130° C. to remove most of the solvent. The dried film was sequentially pre-treated by $H_2O$, 3% $H_2O_2$, $H_2O$, 0.5M $H_2SO_4$, and $H_2O$, respectively, wherein each treatment step was processed at 80° C. for 1 hour. The residue solvent was removed by the described pre-treatment process to form a 10 cm*10 cm*0.003 cm proton exchange membrane. The described proton exchange membrane had ionic conductivity of about $9.21*10^{-2}$ S/cm, Tg of 80° C., and WU of 26.8%. The curve of membrane size change versus temperature is shown in FIG. 2.

Comparative Example 3

16.967 g of bismaleimide (BMI1000, commercially available from DAIWAKASEI) having a formula as shown in Formula 3 and barbituric acid (commercially available from Aldrich) were mixed by a molar ratio of 2:1. The mixture was added to the solvent γ-butyrolactone (GBL), heated to 130° C., and left to react at 130° C. for 5 hours to obtain a hyper-branched polymer. The hyper-branched polymer was analyzed by gel permeation chromatography (GPC) as shown in FIG. 1. The hyper-branched polymer had retention time ($R_t$) of about 26 to 40 minutes, average molecular weight (Mn) of 19,007, weight average molecular weight of 100,658, and polydispersity index (Mw/Mn) of 5.29.

(Formula 3)

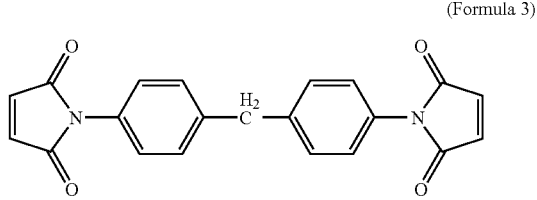

30 g of Nafion aqueous solution (DE2020CS, commercially available from Dupont) was added 18 g DMAc, and then heated to 60° C. by a water bath to replace water and alcohol of the solvent in the Nafion solution with DMAc.

The described hyper-branched polymer solution was added to the Nafion DMAc solution. After stood at 25° C. for 48 hours, the mixture remained opaque. After heated to 50° C. and stood for 16 hours, the mixture remained opaque. After heated to 50° C. and stood for 48 hours, the opaque mixture transformed to a transparent solution, thereby completing an inter-penetrated polymer solution. The hyper-branched polymer, polymerized by bismaleimide and barbituric acid, and the Nafion had a weight ratio of about 10:90 to 20:80.

Figure 3:
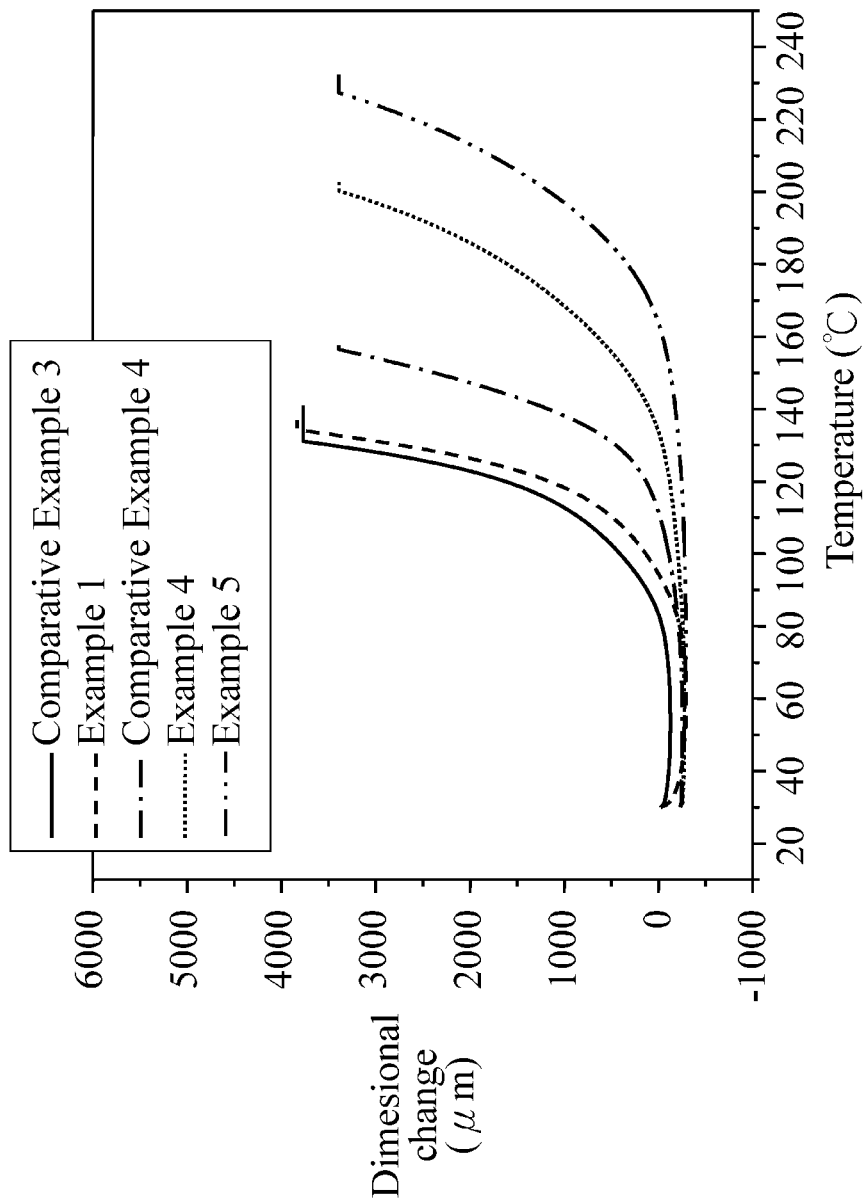
FIG. 3 is a diagram showing the size stability versus temperature curves of the proton exchange membranes in Examples and Comparative Examples of the invention.

The inter-penetrated polymer solution was coated on a substrate, and baked to 130° C. to remove most of the solvent. The dried film was sequentially pre-treated by $H_2O$, 3% $H_2O_2$, $H_2O$, 0.5M $H_2SO_4$, and $H_2O$, respectively, wherein each treatment step was processed at 80° C. for 1 hour. The residue solvent was removed by the described pre-treatment process to form a 10 cm*10 cm*0.003 cm proton exchange membrane. The described proton exchange membrane had ionic conductivity of about $7.60*10^{-2}$ S/cm, Tg of 95° C., and WU of 20.5%. The curve of membrane size change versus temperature is shown in FIGS. 2 and 3.

Example 1

16.967 g of multi-maleimide (BMI2300, commercially available from DAIWAKASEI) having a formula as shown in Formula 1 (wherein n=0 had a molar ratio of 60 mole %, n=1 had a molar ratio of 23 mole %, n=2 had a molar ratio of 10 mole %, and n=3 had a molar ratio of 7 mole %) and barbituric acid (commercially available from Aldrich) were mixed by a molar ratio of 2:1. The mixture was added to the solvent GBL, heated to 105° C., and left to react at 105° C. for 5 hours to obtain a hyper-branched polymer. The hyper-branched polymer was analyzed by a GPC as shown in FIG. 1. The hyper-branched polymer had retention time ($R_f$) of about 26 to 40 minutes, average molecular weight (Mn) of 10,204, weight average molecular weight of 29,981, and polydispersity index (Mw/Mn) of 2.93.

(Formula 1)

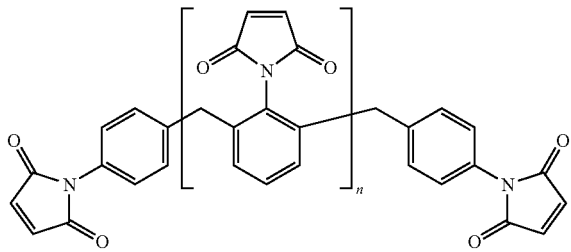

30 g of Nafion aqueous solution (DE2020CS, commercially available from Dupont) was added 18 g DMAc, and then heated to 60° C. by water bath to replace the solvent in Nafion solution from water and alcohol to DMAc.

The described hyper-branched polymer solution was added to the Nafion DMAc solution. Firstly, the mixture was opaque at 25° C. After stood at 25° C. for 48 hours, the opaque mixture transformed to a transparent solution, thereby completing an inter-penetrated polymer solution. If the initial opaque mixture was heated to 50° C. and stood for 16 hours, the opaque mixture also transformed to a transparent solution, thereby completing an inter-penetrated polymer solution. The hyper-branched polymer, polymerized by multi-maleimide and barbituric acid, and the Nafion had a weight ratio of about 10:100.

The inter-penetrated polymer solution was coated on a substrate, and baked to 130° C. to remove most of the solvent. The dried film was sequentially pre-treated by $H_2O$, 3% $H_2O_2$, $H_2O$, 0.5M $H_2SO_4$, and $H_2O$, respectively, wherein each treatment step was processed at 80° C. for 1 hour. The residue solvent was removed by the described pre-treatment process to form a 10 cm*10 cm*0.003 cm proton exchange membrane. The described proton exchange membrane had ionic conductivity of about $1.68*10^{-1}$ S/cm, Tg of 113° C., and WU of 28.6%. The curve of membrane size change versus temperature is shown in FIGS. 2 and 3.

Example 2

16.967 g of multi-maleimide (BMI2300, commercially available from DAIWAKASEI) having a formula as shown in Formula 1 (wherein different n had similar molar ratios as Example 1) and barbituric acid (commercially available from Aldrich) were mixed by a molar ratio of 2:1. The mixture was added to the solvent GBL, heated to 115° C., and left to react at 115° C. for 5 hours to obtain a hyper-branched polymer. The hyper-branched polymer was analyzed by a GPC as shown in FIG. 1. The hyper-branched polymer had retention time ($R_f$) of about 26 to 40 minutes, average molecular weight (Mn) of 16,419, weight average molecular weight of 67,208, and polydispersity index (Mw/Mn) of 4.09.

(Formula 1)

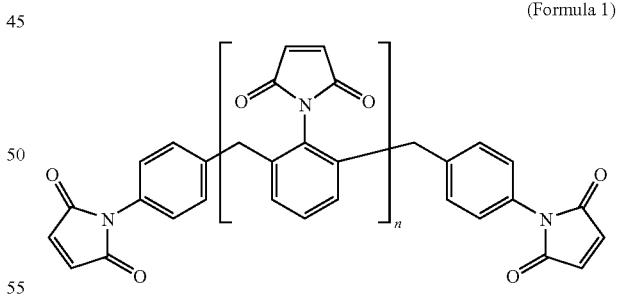

30 g of Nafion aqueous solution (DE2020CS, commercially available from Dupont) was added 18 g DMAc, and then heated to 60° C. by a water bath to replace water and alcohol of the solvent in the Nafion solution with DMAc.

The described hyper-branched polymer solution was added to the Nafion DMAc solution. Firstly, the mixture was opaque at 25° C. After stood at 25° C. for 48 hours, the opaque mixture transformed to a transparent solution, thereby completing an inter-penetrated polymer solution. If the initial opaque mixture was heated to 50° C. and stood for 16 hours, the opaque mixture also transformed to a transparent solution, thereby completing an inter-penetrated polymer solution. The hyper-branched polymer, polymerized by multi-maleimide and barbituric acid, and the Nafion had a weight ratio of about 10:100.

The inter-penetrated polymer solution was coated on a substrate, and baked to 130° C. to remove most of the solvent. The dried film was sequentially pre-treated by $H_2O$, 3% $H_2O_2$, $H_2O$, 0.5M $H_2SO_4$, and $H_2O$, respectively, wherein each treatment step was processed at 80° C. for 1 hour. The residue solvent was removed by the described pre-treatment process to form a 10 cm*10 cm*0.003 cm proton exchange membrane. The described proton exchange membrane had ionic conductivity of about $9.71*10^{-2}$ S/cm, Tg of 108° C., and WU of 29.4%.

Example 3

16.967 g of multi-maleimide (BMI2300, commercially available from DAIWAKASEI) having a formula as shown in Formula 1 (wherein different n had similar molar ratios as Example 1) and barbituric acid (commercially available from Aldrich) were mixed by a molar ratio of 2:1. The mixture was added to the solvent GBL, heated to 125° C., and left to react at 125° C. for 5 hours to obtain a hyper-branched polymer. The hyper-branched polymer was analyzed by GPC as shown in FIG. 1. The hyper-branched polymer had retention time ($R_f$) of about 26 to 40 minutes, average molecular weight (Mn) of 15,602, weight average molecular weight of 65,689, and polydispersity index (Mw/Mn) of 4.18.

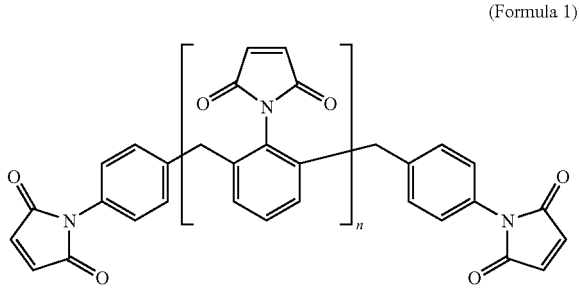

(Formula 1)

30 g of Nafion aqueous solution (DE2020CS, commercially available from Dupont) was added 18 g DMAc, and then heated to 60° C. by a water bath to replace water and alcohol of the solvent in the Nafion solution with DMAc.

The described hyper-branched polymer solution was added to the Nafion DMAc solution. Firstly, the mixture was opaque at 25° C. After stood at 25° C. for 48 hours, the opaque mixture transformed to a transparent solution, thereby completing an inter-penetrated polymer solution. If the initial opaque mixture was heated to 50° C. and stood for 16 hours, the opaque mixture also transformed to a transparent solution, thereby completing an inter-penetrated polymer solution. The hyper-branched polymer, polymerized by multi-maleimide and barbituric acid, and the Nafion had a weight ratio of about 10:100.

The inter-penetrated polymer solution was coated on a substrate, and baked to 130° C. to remove most of the solvent. The dried film was sequentially pre-treated by $H_2O$, 3% $H_2O_2$, $H_2O$, 0.5M $H_2SO_4$, and $H_2O$, respectively, wherein each treatment step was processed at 80° C. for 1 hour. The residue solvent was removed by the described pre-treatment process to form a 10 cm*10 cm*0.003 cm proton exchange membrane. The described proton exchange membrane had ionic conductivity of about $6.50*10^{-2}$ S/cm, Tg of 105° C., and WU of 26.8%.

As shown in a comparison between Examples 1-3 and Comparative Example 3, the hyper-branched polymer polymerized by multi-maleimide had a higher molecular weight than the hyper-branched polymer polymerized by bismaleimide, however, the inter-penetrating rate of the hyper-branched polymer polymerized by multi-maleimide was higher than the hyper-branched polymer polymerized by bismaleimide. As such, the invention may reduce time costs for forming proton exchange membranes, thereby improving process flexibility. As shown in the curves of size change versus temperature of FIG. 2, the proton exchange membrane composed of inter-penetrated hyper-branched polymer (polymerized by multi-maleimide) and Nafion in Examples 1 had better size stability than the proton exchange membranes in Comparative Examples 1-3.

Example 4

25.451 g of multi-maleimide (BMI2300, commercially available from DAIWAKASEI) having a formula as shown in Formula 1 (wherein different n had similar molar ratios as Example 1) and barbituric acid (commercially available from Aldrich) were mixed by a molar ratio of 2:1. The mixture was added to the solvent GBL, heated to 105° C., and left to react at 105° C. for 4 hours to obtain a hyper-branched polymer.

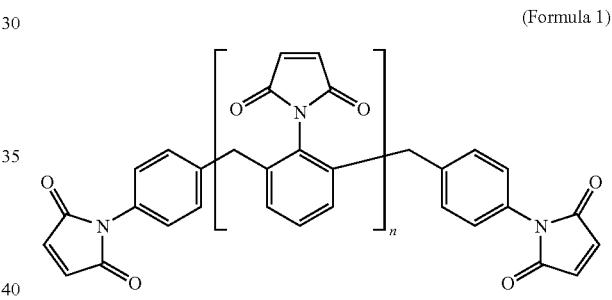

(Formula 1)

30 g of Nafion aqueous solution (DE2020CS, commercially available from Dupont) was added 18 g DMAc, and then heated to 60° C. by a water bath to replace water and alcohol of the solvent in the Nafion solution with DMAc.

The described hyper-branched polymer solution was added to the Nafion DMAc solution. The initial opaque mixture was heated to 50° C. and stood for 16 hours, the opaque mixture transformed to a transparent solution, thereby completing an inter-penetrated polymer solution. The hyper-branched polymer, polymerized by multi-maleimide and barbituric acid, and the Nafion had a weight ratio of about 15:85.

The inter-penetrated polymer solution was coated on a substrate, and baked to 130° C. to remove most of the solvent. The dried film was sequentially pre-treated by $H_2O$, 3% $H_2O_2$, $H_2O$, 0.5M $H_2SO_4$, and $H_2O$, respectively, wherein each treatment step was processed at 80° C. for 1 hour. The residue solvent was removed by the described pre-treatment process to form a 10 cm*10 cm*0.003 cm proton exchange membrane. The described proton exchange membrane had Tg of 145° C. The curve of membrane size change versus temperature is shown in FIG. 3.

Example 5

33.934 g of multi-maleimide (BMI2300, commercially available from DAIWAKASEI) having a formula as shown in Formula 1 (wherein different n had similar molar ratios as Example 1) and barbituric acid (commercially available from Aldrich) were mixed by a molar ratio of 2:1. The mixture was added to the solvent GBL, heated to 105° C., and left to react at 105° C. for 5 hours to obtain a hyper-branched polymer.

(Formula 1)

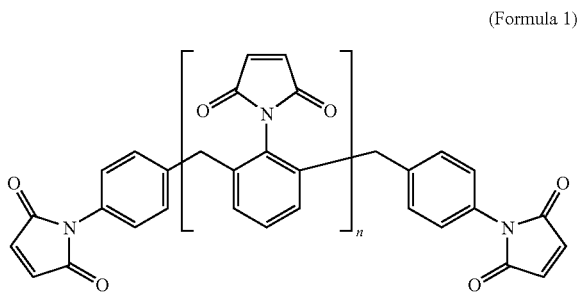

30 g of Nafion aqueous solution (DE2020CS, commercially available from Dupont) was added 18 g DMAc, and then heated to 60° C. by a water bath to replace water and alcohol of the solvent in the Nafion solution with DMAc.

The described hyper-branched polymer solution was added to the Nafion DMAc solution. The initial opaque mixture was heated to 50° C. and stood for 16 hours, the opaque mixture transformed to a transparent solution, thereby completing an inter-penetrated polymer solution. The hyper-branched polymer, polymerized by multi-maleimide and barbituric acid, and the Nafion had a weight ratio of about 20:100.

The inter-penetrated polymer solution was coated on a substrate, and baked to 130° C. to remove most of the solvent. The dried film was sequentially pre-treated by $H_2O$, 3% $H_2O_2$, $H_2O$, 0.5M $H_2SO_4$, and $H_2O$, respectively, wherein each treatment step was processed at 80° C. for 1 hour. The residue solvent was removed by the described pre-treatment process to form a 10 cm*10 cm*0.003 cm proton exchange membrane. The described proton exchange membrane had Tg of 178° C. The curve of membrane size change versus temperature is shown in FIG. 3.

Comparative Example 4

25.41 g of bismaleimide (BMI1000, commercially available from DAIWAKASEI) having a formula as shown in Formula 3 and barbituric acid (commercially available from Aldrich) were mixed by a molar ratio of 2:1. The mixture was added to the solvent GBL, heated to 130° C., and left to react at 130° C. for 5 hours to obtain a hyper-branched polymer.

(Formula 3)

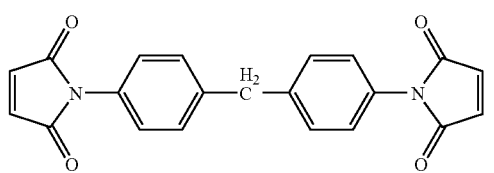

30 g of Nafion aqueous solution (DE2020CS, commercially available from Dupont) was added 18 g DMAc, and then heated to 60° C. by a water bath to replace water and alcohol of the solvent in the Nafion solution with DMAc.

The described hyper-branched polymer solution was added to the Nafion DMAc solution. The initial opaque mixture was heated to 50° C. and stood for 48 hours, the opaque mixture transformed to a transparent solution, thereby completing an inter-penetrated polymer solution. The hyper-branched polymer, polymerized by bismaleimide and barbituric acid, and the Nafion had a weight ratio of about 15:85.

The inter-penetrated polymer solution was coated on a substrate, and baked to 130° C. to remove most of the solvent. The dried film was sequentially pre-treated by $H_2O$, 3% $H_2O_2$, $H_2O$, 0.5M $H_2SO_4$, and $H_2O$, respectively, wherein each treatment step was processed at 80° C. for 1 hour. The residue solvent was removed by the described pre-treatment process to form a 10 cm*10 cm*0.003 cm proton exchange membrane. The described proton exchange membrane had Tg of 130° C. The curve of membrane size change versus temperature is shown in FIG. 3.

As shown in the curves of size change versus temperature of FIG. 3, even if the same weight ratio of the hyper-branched polymer and the Nafion is adopted, e.g. Example 1 compared to Comparative Example 3 or Example 4 compared to Comparative Example 4, the proton exchange membrane composed of the inter-penetrated hyper-branched polymer (polymerized by multi-maleimide) and Nafion has higher Tg and better size stability.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An inter-penetrated proton exchange membrane, comprising;
    80 to 90 parts by weight of the sulfonated tetrafluoroethylene copolymer; and
    20 to 10 parts by weight of hyper-branched polymer polymerized by multi-maleimide and barbituric acid,
    wherein the sulfonated tetrafluoroethylene copolymer and the hyper-branched polymer inter-penetrate each other, and
    wherein the multi-maleimide is represented by formula as below:

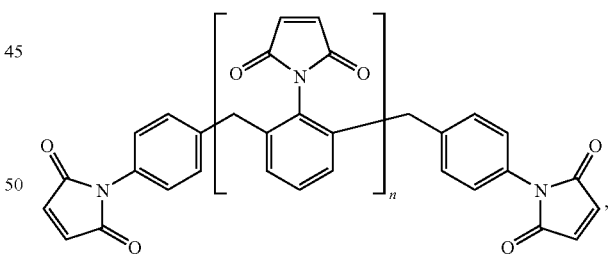

wherein n is an integer of 1 to 4.

2. The inter-penetrated proton exchange membrane as claimed in claim 1, wherein the multi-maleimide and the barbituric acid have a molar ratio of 10:1 to 1:1.

3. A proton exchange membrane fuel cell, comprising the inter-penetrated proton exchange membrane as claimed in claim 1.

4. A method for forming an inter-penetrated proton exchange membrane, comprising:
    copolymerizing multi-maleimide and barbituric acid to form a hyper-branched polymer;
    replacing water of the sulfonated tetrafluoroethylene copolymer aqueous solution with dimethyl acetamide (DMAc);

adding 10 to 20 parts by weight of the hyper-branched polymer to 90 to 80 parts by weight of the sulfonated tetrafluorethylene copolymer in a DMAc solution to form a mixture;

standing and heating the mixture to 50° C. to inter-penetrate the hyper-branched polymer and the sulfonated tetrafluoroethylene copolymer, thereby forming an inter-penetrated polymer solution;

coating the inter-penetrated polymer solution on a substrate; and baking and pre-treating the coating to remove residue DMAc for completing an inter-penetrated proton exchange membrane, wherein the multi-maleimide is represented by formula as below:

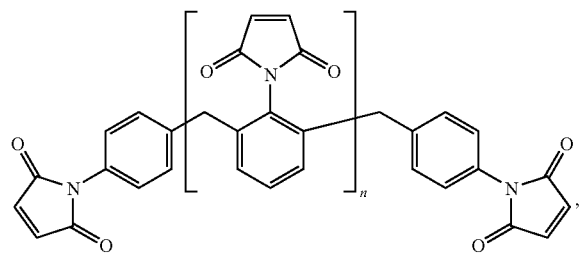

wherein n is an integer of 1 to 4.

5. The method as claimed in claim 4, wherein the multi-maleimide and the barbituric acid have a molar ratio of 10:1 to 1:1.

6. The method of claim 4, wherein n is 1.

7. The method of claim 4, wherein n is 2.

8. The method of claim 4, wherein n is 3.

9. The method of claim 4, wherein n is 4.

10. The proton exchange membrane fuel cell of claim 3, wherein n is 1.

11. The proton exchange membrane fuel cell of claim 3, wherein N is 2.

12. The proton exchange membrane fuel cell of claim 3, wherein n is 3.

13. The proton exchange membrane fuel cell of claim 3, wherein n is 4.

14. The inter-penetrated proton exchange membrane of claim 1, wherein n is 1.

15. The inter-penetrated proton exchange membrane of claim 1, wherein n is 2.

16. The inter-penetrated proton exchange membrane of claim 1, wherein n is 3.

17. The inter-penetrated proton exchange membrane of claim 1, wherein n is 4.

* * * * *